United States Patent
Yang et al.

(10) Patent No.: US 10,859,864 B2
(45) Date of Patent: Dec. 8, 2020

(54) DISPLAY DEVICE

(71) Applicant: WUHAN CHINA STAR OPTOELECTRONICS TECHNOLOGY CO., LTD., Wuhan (CN)

(72) Inventors: Yong Yang, Wuhan (CN); Xin Zhang, Wuhan (CN); Guowei Zha, Wuhan (CN); Guiyang Zhang, Wuhan (CN)

(*) Notice: Subject to any disclaimer, the term of this patent is extended or adjusted under 35 U.S.C. 154(b) by 0 days.

(21) Appl. No.: 16/475,134

(22) PCT Filed: Apr. 24, 2019

(86) PCT No.: PCT/CN2019/083982
§ 371 (c)(1),
(2) Date: Jul. 1, 2019

(87) PCT Pub. No.: WO2020/133838
PCT Pub. Date: Jul. 2, 2020

(65) Prior Publication Data
US 2020/0249506 A1  Aug. 6, 2020

(30) Foreign Application Priority Data
Dec. 29, 2018 (CN) .......................... 2018 1 1646065

(51) Int. Cl.
*G02F 1/1334* (2006.01)
*G02F 1/1335* (2006.01)
*G02F 1/1343* (2006.01)
*G02F 1/13357* (2006.01)

(52) U.S. Cl.
CPC ...... *G02F 1/1334* (2013.01); *G02F 1/133514* (2013.01); *G02F 1/133615* (2013.01); *G02F 1/134309* (2013.01); *G02F 2001/134372* (2013.01); *G02F 2201/123* (2013.01)

(58) Field of Classification Search
CPC ............. G02F 1/1334; G02F 1/133514; G02F 1/134309; G02F 2201/123; G02F 2001/134372; G02F 1/133615
See application file for complete search history.

(56) References Cited

U.S. PATENT DOCUMENTS

| 9,964,827 B1 | 5/2018 | Lee et al. | |
| 2010/0171903 A1* | 7/2010 | Okuyama | G02F 1/133615 349/65 |
| 2019/0331955 A1* | 10/2019 | Lee | G02F 1/13306 |

FOREIGN PATENT DOCUMENTS

| CN | 101187749 A | 5/2008 |
| CN | 101846270 A | 9/2010 |
| CN | 102628579 A | 8/2012 |
| CN | 103293744 A | 9/2013 |
| CN | 108761934 A | 11/2018 |
| KR | 20180111338 A | 10/2018 |

* cited by examiner

*Primary Examiner* — Nathanael R Briggs

(57) ABSTRACT

The present invention provides a display device including: a first liquid crystal cell including a first electrode layer, a polymer dispersed liquid crystal layer, and a first array substrate, wherein the first array substrate includes a second electrode layer, the second electrode layer includes a plurality of first pixel electrodes, and a light source is disposed at a side of the first liquid crystal cell.

20 Claims, 2 Drawing Sheets

DISPLAY DEVICE

BACKGROUND OF INVENTION

Field of Invention

The present invention relates to a field of display technology, and in particular, to a display device.

Description of Prior Art

Compared with a traditional cathode ray tube (CRT), a liquid crystal display (LCD) has many advantages such as lightness and thinness, no radiation, no flicker, and low energy consumption, etc., and thus is widely used. As an important indicator of LCD display, contrast has become one of the important parameters to measure the quality of LCD.

In order to improve the contrast of LCD displays, negative liquid crystals are currently used instead of positive liquid crystals to reduce light leakage of the liquid crystals, or a double-layered liquid crystal light control layer is used to reduce light leakage in a dark state. However, all the above methods require a backlight module, and a light guide plate and a diffuser sheet in the backlight module may cause loss of light provided by the light source, thereby reducing the utilization of light.

Therefore, it is necessary to provide a display device to solve the problems of the prior art.

SUMMARY OF INVENTION

An object of the present invention is to provide a display device which can improve the utilization of light.

To solve the above technical problems, the present invention provides a display device including: a first liquid crystal cell including a first electrode layer, a polymer dispersed liquid crystal layer, and a first array substrate, wherein the first array substrate includes a second electrode layer; and the second electrode layer includes a plurality of first pixel electrodes; a light source disposed at a side of the first liquid crystal cell and positioned corresponding to the polymer dispersed liquid crystal layer, wherein when the first liquid crystal cell is not applied with a driving voltage, the first liquid crystal cell is in a first working state, and when the first liquid crystal cell is applied with the driving voltage, the liquid crystal cell is in a second working state.

The present invention provides a display device including: a first liquid crystal cell including a first electrode layer, a polymer dispersed liquid crystal layer, and a first array substrate, wherein the first array substrate includes a second electrode layer, the second electrode layer includes a plurality of first pixel electrodes, and a light source is disposed at a side of the first liquid crystal cell.

In the display device of the present invention, the display device further includes a color filter substrate disposed above the first liquid crystal cell.

In the display device of the present invention, the color filter substrate includes a plurality of color blocks corresponding to the plurality of first pixel electrodes.

In the display device of the present invention, the display device further includes: a second liquid crystal cell including a color filter substrate, a second liquid crystal layer, and a second array substrate, the second array substrate including a third electrode layer, the third electrode layer including a plurality of second pixel electrodes, the color filter substrate including a plurality of color blocks corresponding to the second pixel electrodes.

In the display device of the present invention, the first pixel electrodes correspond to at least one of the plurality of second pixel electrodes.

In the display device of the present invention, the first pixel electrodes correspond to a number n of the second pixel electrodes, wherein n is an integer, $2 \leq n \leq 10$.

In the display device of the present invention, the second liquid crystal cell is one of a vertical alignment mode, a twisted nematic mode, and a fringe field switching mode, and the first liquid crystal cell is a vertical alignment mode or a twisted nematic mode.

In the display device of the present invention, the second liquid crystal cell is attached to the first liquid crystal cell by frame bonding.

In the display device of the present invention, the light source corresponds to the polymer dispersed liquid crystal layer.

In the display device of the present invention, when the first liquid crystal cell is not applied with a driving voltage, the first liquid crystal cell is in a first working state, and when the first liquid crystal cell is applied with the driving voltage, the liquid crystal cell is in a second working state.

In the display device of the present invention, a light source is provided at a side of a first liquid crystal cell, and the first liquid crystal cell includes a first electrode layer, a polymer dispersed liquid crystal layer, and a first array substrate, wherein the first array substrate includes a second electrode layer including a plurality of first pixel electrodes. Since the first liquid crystal cell is used as a light guiding and light control member, the loss of light is reduced, and the utilization of light is improved.

DETAILED DESCRIPTION OF PREFERRED EMBODIMENTS

The following description of the various embodiments is provided to illustrate the specific embodiments of the invention. The spatially relative directional terms mentioned in the present invention, such as "upper", "lower", "before", "after", "left", "right", "inside", "outside", "side", etc. and the like, may be used herein for ease of description to describe one element or feature's relationship to another element(s) or feature(s) as illustrated in the figures which are merely references. The spatially relative terms are intended to encompass different orientations in addition to the orientation as depicted in the figures.

Figure 1:
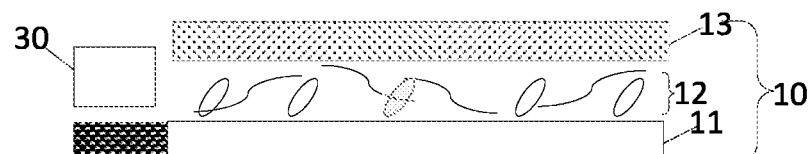
FIG. 1 is a schematic structural diagram of a display device according to a first embodiment of the present invention.

Refer to FIGS. 1-4. FIG. 1 is a schematic structural diagram of a display device according to a first embodiment of the present invention.

As shown in FIG. 1, the display device of the present embodiment includes a first liquid crystal cell 10 and a light source 30. The first liquid crystal cell 10 includes a first array substrate 11, a polymer dispersed liquid crystal layer 12, and a first electrode layer 13.

Figure 2:
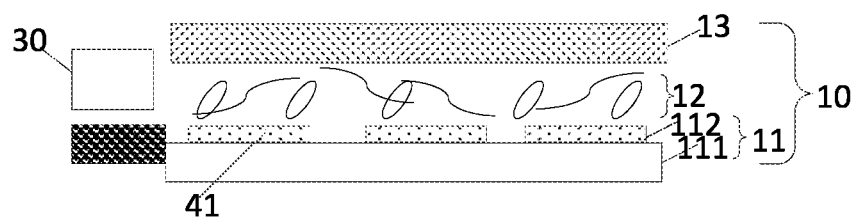
FIG. 2 is a schematic diagram of a preferred structure of a display device according to a first embodiment of the present invention.

As shown in FIG. 2, the first array substrate 11 includes a second electrode layer 112, and the second electrode layer 112 includes a plurality of first pixel electrodes 41. The first array substrate 11 further includes a first base substrate 111, and the second electrode layer 112 is located on the first base substrate 111. In an embodiment, the first electrode layer 13 is a common electrode, and the first electrode layer 13 and the second electrode layer 112 are both made of a material of indium tin oxide (ITO). The polymer dispersed liquid crystal layer 12 includes liquid crystals and a polymer material.

The light source 30 is disposed at a side of the first liquid crystal cell 10. For example, the light source 30 is disposed on a left side or a right side of the first liquid crystal cell 10. In order to further improve the utilization and transmittance of light, the light source 30 is positioned corresponding to the polymer dispersed liquid crystal layer 12.

Figure 3:
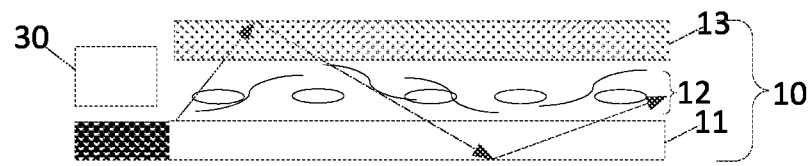
FIG. 3 is a schematic view showing the working principle of the first liquid crystal cell of the present invention when no voltage is applied to the first liquid crystal cell.
Figure 4:
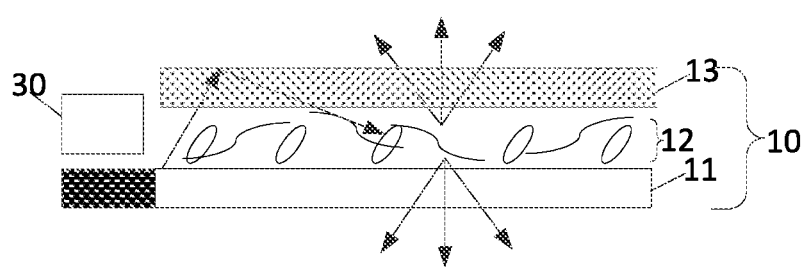
FIG. 4 is a schematic view showing the working principle of the first liquid crystal cell of the present invention when a voltage is applied to the first liquid crystal cell of the present invention.

As shown in FIGS. 3 and 4, when no driving voltage is applied to the first liquid crystal cell 10, the liquid crystal cell 10 is in a first working state. The first working state is a dark state display.

When a driving voltage is applied to the first liquid crystal cell 10, the liquid crystal cell 10 is in a second working state. The second working state is a bright state display.

A specific working process is shown in FIG. 3. When no driving voltage is applied to the first liquid crystal cell 10, refractive indices of the liquid crystal molecules and the polymer materials in all directions are substantially identical, and the liquid crystal cell exhibits a transparent state. Due to a difference in refractive indices between the liquid crystal cell and air, the light emitted by the light source forms an optical waveguide in the liquid crystal cell and cannot be emitted, resulting in a dark state display.

As shown in FIG. 4, when the driving voltage is applied to the first liquid crystal cell 10, the refractive indices of the liquid crystal molecules and the polymer in different directions are different, the liquid crystal cell 10 exhibits a scattering state, and part of the light is scattered upward and emits out, showing a bright state.

Since the first liquid crystal cell is used as a light guiding and light control member to replace the light guide plate and the diffuser sheet in a backlight module, the loss of light is reduced, and the utilization of light is improved. In addition, the power consumption is reduced due to the improvement of the utilization of light.

In the display device of the present invention, the light source is provided at a side of a first liquid crystal cell, and the first liquid crystal cell includes a first electrode layer, a polymer dispersed liquid crystal layer, and a first array substrate, wherein the first array substrate includes a second electrode layer including a plurality of first pixel electrodes. Since the first liquid crystal cell is used as a light guiding and light control member, the loss of light is reduced, and the utilization of light is improved.

Figure 5:
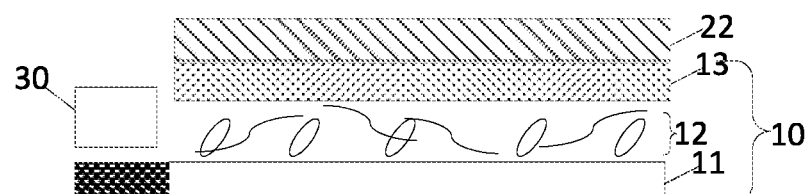
FIG. 5 is a schematic structural diagram of a display device according to a second embodiment of the present invention.
Figure 6:
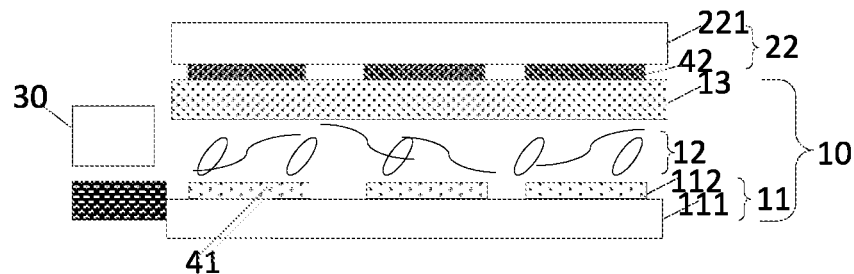
FIG. 6 is a schematic diagram of a preferred structure of a display device according to a second embodiment of the present invention.

Refer to FIGS. 5 and 6. FIG. 5 is a schematic structural diagram of a display device according to a second embodiment of the present invention.

As shown in FIG. 5, the display device of this embodiment further includes a color filter substrate 22 as compared to the previous embodiment.

The color filter substrate 22 is disposed above the first liquid crystal cell 10, wherein the color filter substrate 22 is disposed above the first electrode layer 13. In order to further increase the light transmittance, the color filter substrate 22 is attached to the first liquid crystal cell 10 by frame bonding. That is, a periphery of the color filter substrate 22 is attached to a periphery of the first liquid crystal cell 10.

As shown in FIG. 6, the color filter substrate 22 includes a second base substrate 221 and a plurality of color blocks 42, and the color blocks 42 are located below the second base substrate 221. The first pixel electrodes 41 correspond to the color blocks 42. The color blocks 42 include a red color block, a green color block, and a blue color block. In an embodiment, each of the first pixel electrodes 41 corresponds to one of the color blocks 42. Although each of the first pixel electrodes in FIG. 6 corresponds to one of the color blocks, the present invention is not limited thereto. Of course, it can be understood that each of the first pixel electrodes may also correspond to two or more of the color blocks.

The display device of the present embodiment can realize a high-contrast color image display, and its structure is relatively simple and thin. The working principle of the first liquid crystal cell is the same as that of the first embodiment, and details can be referred to the above, which are not repeated herein for brevity.

Compared to the first embodiment, since the first liquid crystal cell is used to control optical waveguide and pixel-level backlight local dimming, the display device realizes the bright state and the dark state display, and fineness of the display image is higher while realizing a high contrast display, avoiding a halo phenomenon caused by conventional backlight local dimming.

In the display device of the embodiment, a high-contrast color image display is realized by providing a color filter substrate on the first liquid crystal cell, which avoids the halo phenomenon, improves the light utilization efficiency, and reduces power consumption. Secondly, due to its relatively simple structure, the process is simplified. In addition, due to its thin thickness, an overall thickness of the display device is reduced.

Figure 7:
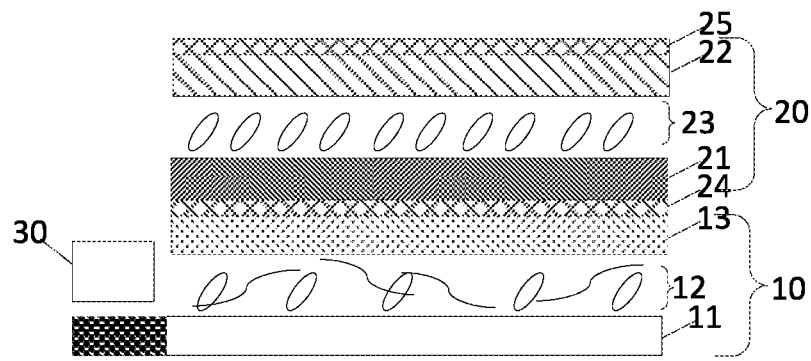
FIG. 7 is a schematic structural diagram of a display device according to a third embodiment of the present invention.
Figure 8:
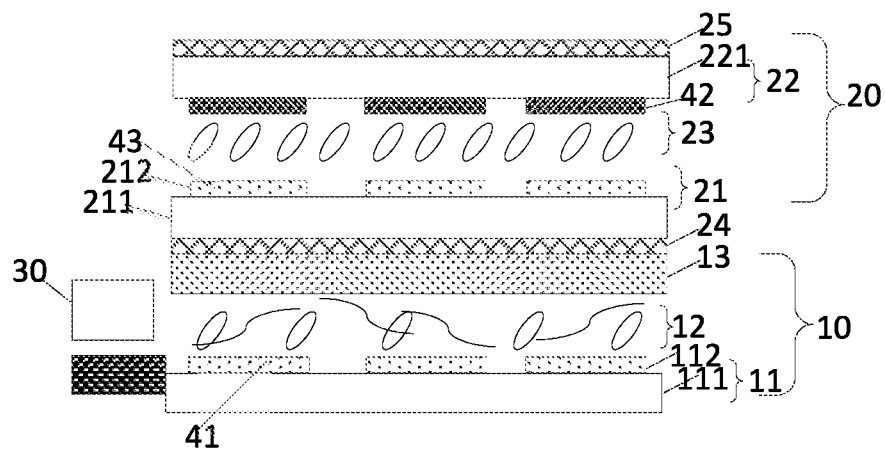
FIG. 8 is a schematic diagram of a preferred structure of a display device according to a third embodiment of the present invention.

Please refer to FIG. 7 and FIG. 8. FIG. 7 is a schematic structural diagram of a display device according to a third embodiment of the present invention.

As shown in FIG. 7, the display device of the present embodiment further includes: a second liquid crystal cell 20 including a second array substrate 21, a color filter substrate 22, and a second liquid crystal layer 23.

As shown in FIG. 8, the second array substrate 21 includes a third electrode layer 212, and the third electrode layer 212 includes a plurality of second pixel electrodes 43. The second array substrate 21 further includes a third base substrate 211 on which the third electrode layer 212 is located.

The color filter substrate 22 includes a second base substrate 221 and a plurality of color blocks 42 located below the second base substrate 221. The second pixel electrodes 43 correspond to the color blocks 42. The color blocks 42 include a red color block, a green color block, and a blue color block. Each of the second pixel electrodes 43 corresponds to one of the color blocks 42.

In order to further improve fineness of image quality, each of the first pixel electrodes 41 corresponds to one of the second pixel electrodes 43. Although each of the first pixel electrodes in FIG. 8 corresponds to one of the second pixel electrodes, the present invention is not limited thereto. It can be understood that the first pixel electrodes 41 can also correspond to a number n of the second pixel electrodes, where n is an integer, 2≤n≤10, to improve the fineness of image quality and to simplify the process.

The second liquid crystal cell 20 further includes a first polarizer 24 and a second polarizer 25.

The first polarizer 24 is disposed outside the array substrate 21, more particularly, below the array substrate 21.

The second polarizer 25 is disposed outside the color filter substrate 21, more particularly, above the color filter substrate 22.

The mode of the second liquid crystal cell 20 is one of a vertical alignment (VA) mode, a twisted nematic (TN) mode, and a fringe field switching (FFS) mode. The mode of the first liquid crystal cell 10 is VA mode or TN mode.

The second liquid crystal cell 20 is attached to the first liquid crystal cell 10 by frame bonding.

The display device of this embodiment can realize fine image display of high contrast, wherein the working principle of the first liquid crystal cell is the same as that of the first embodiment.

Compared to the first embodiment, since the first liquid crystal cell is used to control optical waveguide and pixel-level backlight local dimming, the display device realizes the bright state and the dark state display, and fineness of the display image is higher while realizing a high contrast display, avoiding a halo phenomenon caused by conventional backlight local dimming, and improving the light utilization efficiency and reducing the power consumption.

In the display device of the embodiment, a fine image display of high contrast is realized by providing the second liquid crystal cell on the first liquid crystal cell, avoiding the halo phenomenon, improving the light utilization efficiency, and reducing the power consumption. In addition, the display effect is also improved.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display device, comprising:
    a first liquid crystal cell comprising a first electrode layer, a polymer dispersed liquid crystal layer, and a first array substrate, wherein the first array substrate comprises a second electrode layer; and the second electrode layer comprises a plurality of first pixel electrodes;
    a light source disposed at a side of the first liquid crystal cell and positioned corresponding to the polymer dispersed liquid crystal layer; and
    a polarizer disposed on and in direct contact with the first electrode layer,
    wherein when the first liquid crystal cell is not applied with a driving voltage, the first liquid crystal cell is in a first working state, and
    when the first liquid crystal cell is applied with the driving voltage, the liquid crystal cell is in a second working state.

2. The display device according to claim 1, wherein the display device further comprises a color filter substrate disposed above the first liquid crystal cell.

3. The display device according to claim 2, wherein the color filter substrate comprises a plurality of color blocks corresponding to the plurality of first pixel electrodes.

4. The display device according to claim 2, wherein the color filter substrate is attached to the first liquid crystal cell by frame bonding.

5. The display device according to claim 1, wherein the display device further comprises:
    a second liquid crystal cell comprising a color filter substrate, a second liquid crystal layer, and a second array substrate, the second array substrate comprising a third electrode layer, the third electrode layer comprising a plurality of second pixel electrodes, the color filter substrate comprising a plurality of color blocks corresponding to the second pixel electrodes.

6. The display device according to claim 5, wherein the first pixel electrodes correspond to at least one of the plurality of second pixel electrodes.

7. The display device according to claim 6, wherein the first pixel electrodes correspond to a number n of the second pixel electrodes, wherein n is an integer, 2≤n≤10.

8. The display device according to claim 5, wherein the second liquid crystal cell is one of a vertical alignment mode, a twisted nematic mode, and a fringe field switching mode, and the first liquid crystal cell is a vertical alignment mode or a twisted nematic mode.

9. The display device according to claim 5, wherein the second liquid crystal cell is attached to the first liquid crystal cell by frame bonding.

10. The display device according to claim 1, wherein the first electrode layer and the second electrode layer are both made of a material of indium tin oxide.

11. A display device comprising:
    a first liquid crystal cell comprising a first electrode layer, a polymer dispersed liquid crystal layer, and a first array substrate, the first array substrate comprising a second electrode layer, and the second electrode layer comprising a plurality of first pixel electrodes;
    a light source disposed at a side of the first liquid crystal cell; and
    a polarizer disposed on and in direct contact with the first electrode layer.

12. The display device according to claim 11, wherein the display device further comprises a color filter substrate disposed above the first liquid crystal cell.

13. The display device according to claim 12, wherein the color filter substrate comprises a plurality of color blocks corresponding to the plurality of first pixel electrodes.

14. The display device according to claim 11, wherein the display device further comprises:
    a second liquid crystal cell comprising a color filter substrate, a second liquid crystal layer, and a second array substrate, the second array substrate comprising a third electrode layer, the third electrode layer comprising a plurality of second pixel electrodes, the color filter substrate comprising a plurality of color blocks corresponding to the second pixel electrodes.

15. The display device according to claim 14, wherein the first pixel electrodes correspond to at least one of the plurality of second pixel electrodes.

16. The display device according to claim 15, wherein the first pixel electrodes correspond to a number n of the second pixel electrodes, wherein n is an integer, $2 \leq n \leq 10$.

17. The display device according to claim 14, wherein the second liquid crystal cell is one of a vertical alignment mode, a twisted nematic mode, and a fringe field switching mode, and the first liquid crystal cell is a vertical alignment mode or a twisted nematic mode.

18. The display device according to claim 14, wherein the second liquid crystal cell is attached to the first liquid crystal cell by frame bonding.

19. The display device according to claim 11, wherein the light source corresponds to the polymer dispersed liquid crystal layer.

20. The display device according to claim 11, wherein when the first liquid crystal cell is not applied with a driving voltage, the first liquid crystal cell is in a first working state, and when the first liquid crystal cell is applied with the driving voltage, the liquid crystal cell is in a second working state.

* * * * *